United States Patent [19]

Nelson

[11] 4,350,050

[45] Sep. 21, 1982

[54] FLOW TRANSDUCER

[75] Inventor: Roger J. Nelson, Cedar Falls, Iowa

[73] Assignee: Deere & Company, Moline, Ill.

[21] Appl. No.: 233,279

[22] Filed: Feb. 10, 1981

[51] Int. Cl.³ .............................................. G01F 1/24
[52] U.S. Cl. ................................................. 73/861.54
[58] Field of Search ............ 73/861.54, 861.56, 861.58

[56] References Cited

U.S. PATENT DOCUMENTS

| | | | |
|---|---|---|---|
| 2,069,309 | 2/1937 | Henszey | 73/861.54 |
| 2,609,831 | 9/1952 | MacGeorge | |
| 2,640,356 | 6/1953 | Shannon | 73/861.54 |
| 3,076,335 | 2/1963 | Rosaen | |
| 3,368,402 | 2/1968 | Hop et al. | 73/861.54 |
| 3,528,288 | 9/1970 | Scourtes | |
| 3,623,046 | 11/1971 | Scourtes | |
| 4,003,255 | 1/1977 | Spencer | |
| 4,041,758 | 8/1977 | Stenberg | |
| 4,194,394 | 3/1980 | Bartholomaus | 73/861.54 |
| 4,205,592 | 6/1980 | Haüssler | |

FOREIGN PATENT DOCUMENTS 2000104  7/1971  Fed. Rep. of Germany ... 73/861.54

OTHER PUBLICATIONS

Hedland Products, "Hedland Flowmeter".
Fink, ed., "Electronics Engineers Handbook", McGraw-Hill, 1975, pp. 17-55 and 17-56, (FIG. 17-81).
Licon, Product Bulletin PS-1000 (4 pp.).

Primary Examiner—Herbert Goldstein

[57] ABSTRACT

A fluid flow sensor includes a housing defining a flow path for fluid flow therethrough. A valve member slidably engages the housing and moves with respect to a fixed cylindrical metering member in response to fluid flow through the flow path. A spring biases the valve member to a no-flow position. A portion of the valve member engages a seat to prevent reverse fluid flow. The metering member receives one end of the valve member while a reluctive displacement transducer is received by a bore extending into the valve member from the other end.

13 Claims, 5 Drawing Figures

FLOW TRANSDUCER

BACKGROUND OF THE INVENTION

This invention relates to a fluid flow transducer for sensing one-way fluid flow.

Many designs of both one-way and two-way fluid flow sensors are known in the prior art. These prior art flow sensors generally include a flow-responsive valve member which is movable inside a housing, with respect to a metering member. Some type of displacement transducer is coupled to the valve member to generate an electrical or visual signal indicative of the position of the valve member. Most of the known flow sensors are bulky because the parts of the displacement transducers, such as an inductor coil, transformer coils or a variable resistor, are positioned outside of the movable valve member, and in some cases, even outside of the housing.

SUMMARY OF THE INVENTION

An advantage of the present invention is that it provides a simple and compact flow transducer assembly.

Another advantage of the present invention is that it provides a flow transducer which incorporates a displacement transducer which is substantially isolated from the fluid flow path and thus, protected from contamination.

Another advantage of the present invention is that it provides a flow sensor with an integral check valve to prevent reverse flow.

These and other advantages are achieved, according to the present invention, which provides a flow transducer with a movable valve member with one end received by a cylindrical fluid metering member and with the other end receiving the relatively movable parts of a displacement transducer. The displacement transducer parts are located in a chamber isolated from the flow path, except for a relief passage which extends through a side wall of the valve member. A portion of the valve member acts as a check valve to prevent reverse fluid flow through the flow path. A spring urges the valve member to a no-flow position. The displacement transducer generates an output signal indicative of the position of the valve member, which, in turn, is proportional to the rate of fluid flow.

DETAILED DESCRIPTION

Figure 1:
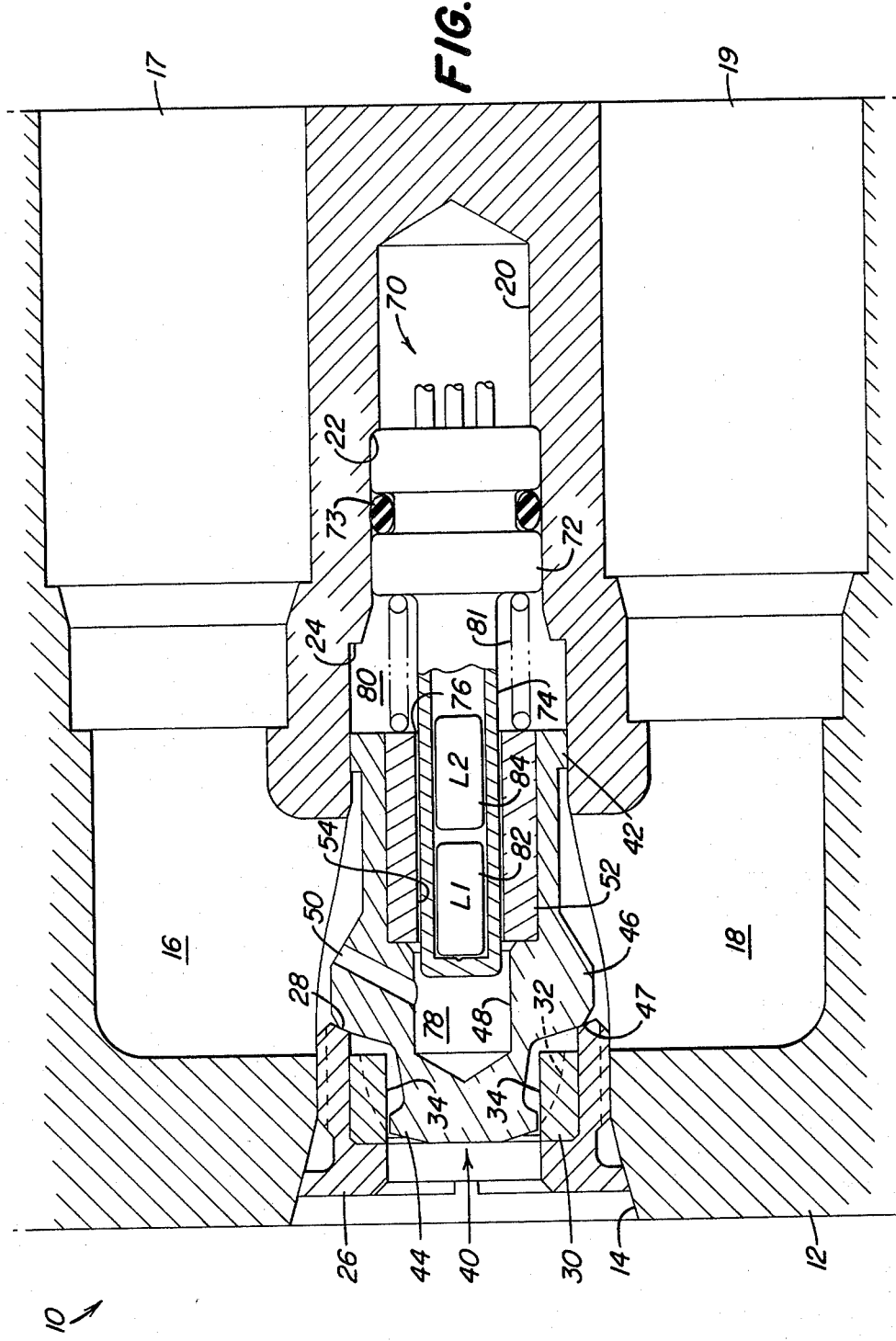
FIG. 1 is a partial sectional assembly view of a fluid flow transducer constructed according to applicant's invention.

A fluid flow transducer 10 includes a housing 12 having an inlet 14 and a pair of L-shaped outlet passages 16 and 18, terminating at outlets 17 and 19, respectively. A stepped bore 20 extends into the housing 12 from the inlet 14. The outlet passages 16 and 18 intersect opposite sides of the bore 20. The wall of stepped bore 20 defines a pair of annular shoulders 22 and 24. Fluid flows through the transducer 10 along a flow path comprised of inlet 14, a portion of bore 20, the outlet passages 16 and 18 and outlets 17 and 19.

Figure 2:
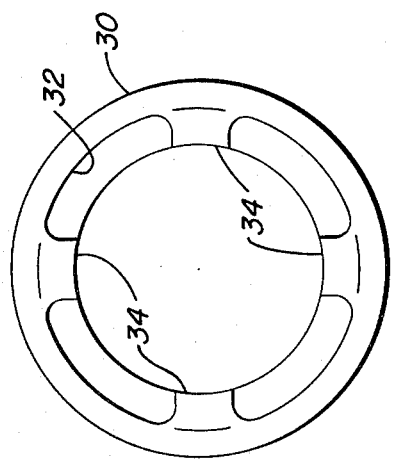
FIG. 2 is an enlarged end view of the metering member of applicant's invention.

A hollow cylindrical fitting 26 is threadably secured to the housing 12 in the inlet 14. The downstream end of fitting 26 defines a cylindrical check valve sealing surface 28. A hollow cylindrical metering member 30 is press-fitted into the hollow fitting 26. A tapered bore 32 extends partially through metering member 30 with a larger diameter end downstream of its smaller diameter end. Four guiding ribs 34 extend radially inwardly from and axially along the interior of metering member 30, as seen in FIGS. 1 and 2.

A generally cylindrical, magnetic steel valve member 40 is movably mounted in the housing 12. One end of the valve member 40 includes a radially outwardly extending flange or projection 42 which slidably engages a portion of housing bore 20. The other end of valve member 40 terminates in flange or projection 44 which is received by the metering member 30 and which slidably engages the four ribs 34 of the metering member 30. The valve member 40 is maintained in axial alignment in the housing 12 by means of its sliding engagement with the housing 12 and the ribs 34. The flange 44 also cooperates with the wall of the tapered bore 32 of metering member 30 to define a variable flow restriction or orifice therebetween. The shape of the tapered bore 32 may be modified to control the manner in which the valve member 40 moves in response to fluid flow through the transducer 10. For example, by reducing the degree of taper at the upstream end of bore 32, a larger amount of valve member displacement can be obtained at relatively low fluid flow rates. With the tapered bore illustrated in FIG. 1, the valve member displacement is a substantially linear function of the rate of fluid flow. Valve member 40 includes a third radially extending projection 46 located axially between projections 42 and 44. Projection 46 includes an annular sealing surface 47 which sealingly engages the sealing surface 28 of fitting 26 to prevent reverse fluid flow from passages 16 and 18 to outlet 14. Shoulder 24 is engageable with the end of valve member 40 to limit the motion of valve member 40 away from metering member 30. Valve member 40 also includes a blind stepped bore 48 which extends axially into the downstream end of valve member 40. A relief passage 50 extends through the body of valve member 40 and communicates the small diameter portion of bore 48 with the outlet passages 16 and 18.

Figure 4:
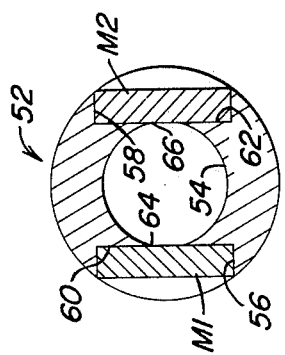
FIG. 4 is a sectional view taken along line 4—4 of FIG. 3.
Figure 3:
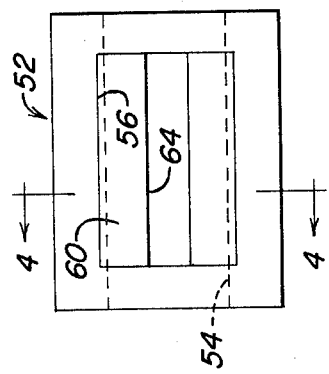
FIG. 3 is an enlarged side view of the magnet carrier of applicant's invention.

A non-magnetic hollow cylindrical magnet carrier 52 is held in the large diameter portion of the valve member stepped bore 48. An axial bore 54 extends completely through the carrier 52. As best seen in FIGS. 3 and 4, a pair of slots 56 and 58, with rectangular cross-sections, are located in opposite sides of the carrier 52 with their bottoms 60 and 62 intersecting the bore 54 to create a pair of rectangular openings 64 and 66 extending therebetween. A pair of permanent bar magnets M1 and M2 are held in the slots 56 and 58 by the wall of the larger diameter portion of the bore 48 in valve member 40. The north poles of magnets M1 and M2 are aligned in the same direction, as shown schematically in FIG. 5.

A cylindrical, non-magnetic support member 70 includes a large diameter double flanged portion 72 held in housing bore 20 and butted against annular shoulder 22. An O-ring seal 73 fits between the two flanges to provide a fluid-tight seal between support member 70 and the wall of housing bore 20. A hollow cylindrical rod 74 extends axially and centrally from an end face of the flanged portion 72. A portion of the hollow rod 74 is coaxially received by the bore 54 of magnet carrier 52. The carrier 52 and the rod 74 are separated by an axially extending annular space or passage 76. The support member 70, the valve member 40 and the wall of housing bore 20 enclose a variable volume chamber comprising first and second variable volume cavities 78 and 80 interconnected via annular passage 76. The volume of chambers 78 and 80 decreases as the valve member moves to the right, viewing FIG. 1. Cavity 78 of the variable volume chamber is communicated with outlet passages 16 and 18 via relief passage 50 to prevent a pressure buildup in cavities 78 and 80 from resisting motion of the valve member 40. A coil spring 81 is mounted coaxially around the rod 74 in cavity 80 with one end engaging the end face of magnet carrier 52 and the other end engaging the flanged portion of support member 70. Spring 81 holds magnet carrier 52 in the stepped bore 48 of valve member 40 and holds flanged portion 72 of support member 70 against shoulder 22. Spring 81 thus urges valve member 40 to the left, viewing FIG. 1, to a no-flow position wherein there is a minimum clearance between metering member 30 and the head projection 44 of valve member 40 and wherein the sealing surface 47 of projection 46 sealingly engages check valve seat 28. This sealing engagement operates as a check valve which prevents reverse fluid flow through flow transducer 10.

Figure 5:
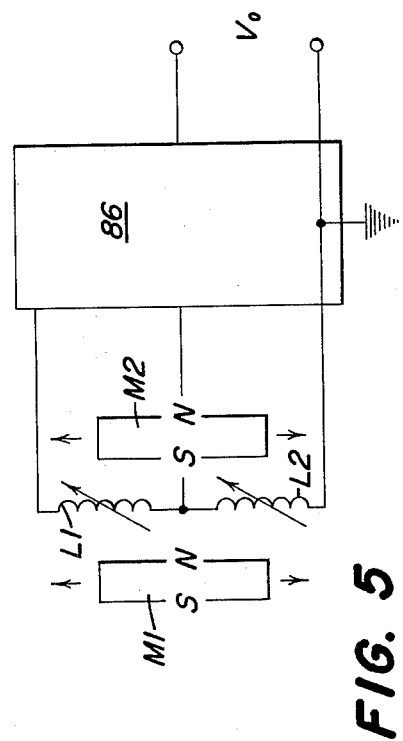
FIG. 5 is a schematic view of a portion of applicant's invention, including signal conditioning circuitry.

A pair of ferrite tubes 82 and 84, which contain variable sensing inductors L1 and L2, respectively, are fixed within the portion of hollow rod 74 which is received by the magnet carrier 52. The ferrite tubes are of the type which may be purchased from Licon, a Division of Illinois Tool Works, Chicago, Ill. The variable inductors L1 and L2 may be connected, as shown in FIG. 5, to an integrated signal conditioning circuit 86, such as the Licon No. 80-330057. For further details, the reader is referred to the Licon Product Bulletin, PS-1000. The magnets M1 and M2, the inductors L1 and L2 and the signal conditioning circuit 86 comprise an inductive bridge-type displacement transducer which senses the position of the valve member 40. It is within the scope of this invention to utilize other types of displacement transducers, such as those utilizing differential transformers, potentiometric resistance elements or variable capacitive elements. A very compact flow transducer is achieved because the parts of the displacement transducer are coaxially received by the movable valve member, instead of being positioned wholly outside of the movable valve member, or outside of the housing, as is the more common practice.

MODE OF OPERATION

When there is no fluid flow through the flow transducer 10, then valve member 40 is maintained by spring 81 in the no-flow position shown in FIG. 1 with surface 47 of projection 46 sealing engaging check valve seat 28. However, when fluid enters inlet 14 to flow through the passages 16 and 18, this fluid flow moves valve member 40 axially to the right to a displaced position, compressing spring 80 until the flow forces on the valve member 40 are balanced by the increased resistance of spring 81. The shape of the metering member bore 32 is such that the amount of valve member displacement is linearly proportional to the rate of fluid flow through the transducer 10. The displacement of valve member 40, in turn, displaces the magnets M1 and M2 with respect to the sensing inductors L1 and L2, thus changing the relative inductance of inductors L1 and L2. This change in relative inductance is converted by signal conditioner 86 to a DC voltage output signal Vo which is thereby proportional to the axial position of the valve member 40 and to the rate of fluid flow through the transducer 10.

I claim:

1. A fluid flow transducer, comprising:
a housing defining a flow path for fluid flow therethrough;
a hollow metering member fixed in the housing and defining a portion of the flow path and having a plurality of ribs extending radially inwardly therefrom;
a flow-responsive valve member movably mounted in the housing and having a variable position therein depending upon the rate of forward fluid flow through the flow path, the valve member comprising a generally cylindrical body having a blind bore extending therein from one end of the body, the body having a first radial projection extending outwardly from the one end for slidably engaging the housing, having a second radial projection extending outwardly from the other end of the body for slidably engaging the plurality of ribs, the second projection being received by the metering member and cooperating therewith to define a variable flow restriction therebetween and having a third radial projection located axially between the first and second projections, the first and second projections cooperating with the housing and the ribs, respectively, to maintain axial alignment of the valve member;
a check valve seat fixed in the flow path for sealingly engaging a surface of the third projection to prevent reverse fluid flow through the flow path;
variable reluctance sensing means coupled to the valve member for sensing the position of the valve member, the sensing means including a first part movable with the valve member and a second part fixed with respect to the housing, both parts being received by the blind bore; and
resilient means biased to urge the valve member towards a no-flow position.

2. The flow transducer of claim 1, wherein:
the housing includes an inlet bore extending into the housing from one end thereof, and a pair of outlet passages intersecting opposite sides of the inlet bore, the outlet passages and a portion of the inlet bore comprising the flow path.

3. The flow transducer of claim 1, further comprising:
a hollow cylindrical inlet fitting fixed to the housing, surrounding a portion of the flow path and having upstream and downstream ends, the downstream end including a surface which comprises the check valve seat, the metering member being fixed coaxially within the inlet fitting upstream from the check valve seat.

4. The flow transducer of claim 1, further comprising:
a first variable volume chamber enclosed by the valve member, the housing and the sensing means;
a second variable volume chamber enclosed by the valve member and the sensing means;
an annular passage extending through the sensing means for communicating the first and second chambers with each other; and a relief passage extending through the valve member for communicating the second chamber with the flow path to prevent fluid pressure in the first and second variable volume chambers from resisting movement of the valve member.

5. The flow transducer of claim 4, wherein:
the resilient means is positioned in the first variable volume chamber.

6. A fluid flow transducer comprising:
a housing defining a flow path for fluid flow therethrough;
a flow-responsive valve member movably mounted in the housing and having a variable position therein depending upon the rate of fluid flow through the flow path, the valve member including first and second bearing surfaces located near opposite ends of the valve member, the first bearing surface slidably engaging the housing, the valve member comprising a generally cylindrical body with first and second radially extending flanges at opposite ends thereof, the peripheral surfaces of the first and second flanges comprising the first and second bearing surfaces, respectively;
a metering member fixed in the flow path and cooperating with the valve member to define a variable flow restriction therebetween, the metering member including guide means for slidably engaging the second bearing surface, the first and second valve member bearing surfaces cooperating with the housing and the guide means to maintain axial alignment of the valve member, the metering member comprising a hollow cylindrical sleeve with a tapered bore extending therein, the tapered bore defining a portion of the flow path and receiving the second flange, the metering member also having a plurality of radially inwardly extending ribs, each rib having an axially extending bearing surface slidably engaging the second bearing surface;
resilient means for urging the valve member towards a no-flow position; and
sensing means mounted in the housing and coupled to the valve member for sensing the position of the valve member.

7. The flow transducer of claim 6, further comprising:
a third flange extending radially from the valve member and positioned axially between the first and second flanges; and
a check valve seat fixed in the flow path and sealingly engageable with a surface of the third flange to prevent reverse fluid flow through the flow path.

8. A fluid flow transducer comprising:
a housing defining a flow path for fluid flow therethrough;
a metering member supported by the housing and defining a portion of the flow path;
a flow-responsive, hollow valve member movably mounted in the housing and having a variable position therein depending upon the rate of fluid flow through the flow path, the valve member having means received by the metering member for cooperating therewith to define a variable flow restriction therebetween, the valve member including a blind bore extending therein;
resilient means for urging the valve member to a no-flow position, the valve member being movable with respect to the metering member in response to fluid flow and against the bias of the resilient means to positions indicative of the rate of fluid flow through the flow path; and
sensing means received by the valve member and coupled thereto for sensing the position of the valve member, the sensing means comprising magnetic means mounted within the bore for movement with the valve member and for producing a magnetic flux, and variable inductance means received by the bore, fixed with respect to the housing for responding to the magnetic flux to sense the position of the magnetic means, the sensing means including a non-magnetic support member mounted in the housing and fixed thereto for supporting the variable inductance means centrally in the bore, the support member having a flanged portion received by and engaging the housing, the resilient means being coupled between the flanged portion and the valve member and including a hollow cylindrical carrier member constructed of non-magnetic material positioned within the bore and engaging a wall thereof, the carrier member having a slot therein for receiving the magnetic means, the carrier member also having an axial bore extending therethrough for receiving the support member and the variable inductance means, the housing, the valve member and the sensing means cooperating to define a variable volume chamber isolated from the flow path except for a relief passage extending through the valve member and communicating the variable volume chamber with the flow path.

9. A fluid flow transducer, comprising:
a housing defining a flow path for fluid flow therethrough;
a hollow metering member fixed in the housing and defining a portion of the flow path and having a plurality of ribs extending radially inwardly therefrom;
a flow-responsive valve member movably mounted in the housing and having a variable position therein depending upon the rate of forward fluid flow through the flow path, the valve member comprising a generally cylindrical body having a blind bore extending therein from one end of the body, the body having a first radial projection extending outwardly from the one end for slidably engaging the housing, having a second radial projection extending outwardly from the other end of the body for slidably engaging the plurality of ribs, the second projection being received by the metering member and cooperating therewith to define a variable flow restriction therebetween and having a third radial projection located axially between the first and second projections, the first and second projections cooperating with the housing and the ribs, respectively, to maintain axial alignment of the valve member;
a check valve seat fixed in the flow path for sealingly engaging a surface of the third projection to prevent reverse fluid flow through the flow path;
sensing means coupled to the valve member for sensing the position of the valve member, the sensing means including a first part movable with the valve member and a second part fixed with respect to the housing, both parts being received by the blind bore; and
resilient means biased to urge the valve member towards a no-flow position.

10. The flow transducer of claim 9, wherein:
the housing includes an inlet bore extending into the housing from one end thereof, and a pair of outlet passages intersecting opposite sides of the inlet bore, the outlet passages and a portion of the inlet bore comprising the flow path.

11. The flow transducer of claim 9, further comprising:
a hollow cylindrical inlet fitting fixed to the housing, surrounding a portion of the flow path and having upstream and downstream ends, the downstream end including a surface which comprises the check valve seat, the metering member being fixed coaxially within the inlet fitting upstream from the check valve seat.

12. The flow transducer of claim 9, further comprising:
a first variable volume chamber enclosed by the valve member, the housing and the sensing means;
a second variable volume chamber enclosed by the valve member and the sensing means;
an annular passage extending through the sensing means for communicating the first and second chambers with each other; and
a relief passage extending through the valve member for communicating the second chamber with the flow path to prevent fluid pressure in the first and second variable volume chambers from resisting movement of the valve member.

13. The flow transducer of claim 12, wherein:
the resilient means is positioned in the first variable volume chamber.

* * * * *